April 23, 1946. L. M. DAHL 2,398,923
COMBINATION DENTAL DIAGNOSIS AND OFFICE DESK
Filed May 23, 1944 3 Sheets-Sheet 1

Inventor
Llewellyn M. Dahl

By Clarence A. O'Brien
and Harvey B. Jacobson
Attorneys

April 23, 1946.  L. M. DAHL  2,398,923
COMBINATION DENTAL DIAGNOSIS AND OFFICE DESK
Filed May 23, 1944    3 Sheets-Sheet 2

Inventor
Llewellyn M. Dahl
By Clarence A. O'Brien
and Harvey B. Jacobson
Attorneys April 23, 1946. L. M. DAHL 2,398,923
COMBINATION DENTAL DIAGNOSIS AND OFFICE DESK
Filed May 23, 1944 3 Sheets-Sheet 3

Inventor
Llewellyn M. Dahl

By Clarence A. O'Brien
and Harvey B. Jacobson
Attorneys

Patented Apr. 23, 1946

2,398,923

UNITED STATES PATENT OFFICE 2,398,923

COMBINATION DENTAL DIAGNOSIS AND OFFICE DESK

Llewellyn M. Dahl, Moorhead, Minn.

Application May 23, 1944, Serial No. 537,015

3 Claims. (Cl. 88—24)

This invention relates to a novel and improved dental office desk characterized by novel means and devices to render it aptly suitable for use by a dentist in effectively undertaking and performing predetermined diagnosis accomplishments.

More specifically, the invention pertains to a combination dental X-ray and photographic viewer, illuminator, enlarger and general utility diagnosis office desk.

The principal object of the invention is to provide a compact and convenient desk having embodied therein such facilities as provide for roentgenogram and photographic slide study, projection and viewing to assist in patient education diagnosis.

Briefly, the preferred embodiment of the invention is characterized by a desk having a viewing screen in its top, a novel illuminated reflector device on the underside of the top in alignment with the screen, and an adjustably mounted projector arranged for focusing the photographs on a mirror to be reflected on the diagnosis or viewing screen.

Other features and advantages will become more readily apparent from the following description and the accompanying illustrative drawings.

In the drawings, wherein like numerals are employed to designate like parts throughout the same:

Figure 4 is a top plan view of the illuminated visor-styled reflector unit.

Figure 5 is a perspective view of said illuminated reflector unit or device.

Figure 1:
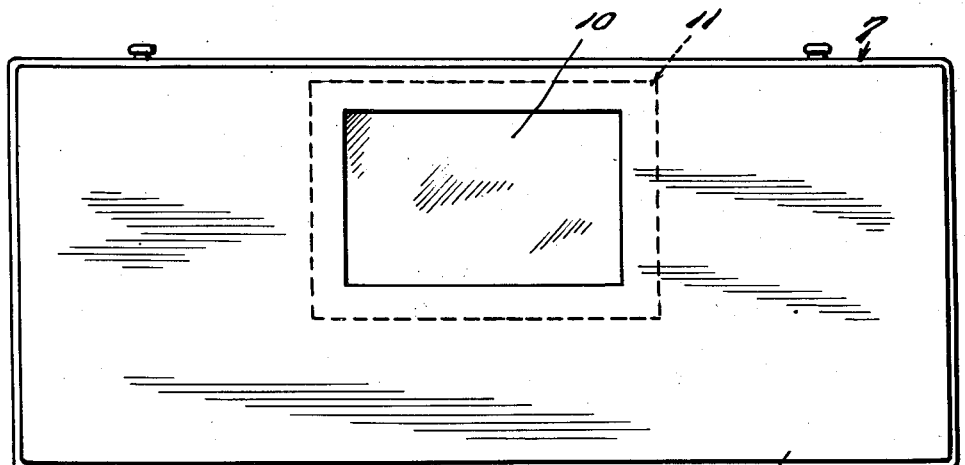
Figure 1 is a top plan view of an ordinary knee-hole office desk for dental use revised and constructed in accordance with the principles of the instant invention.
Figure 2:
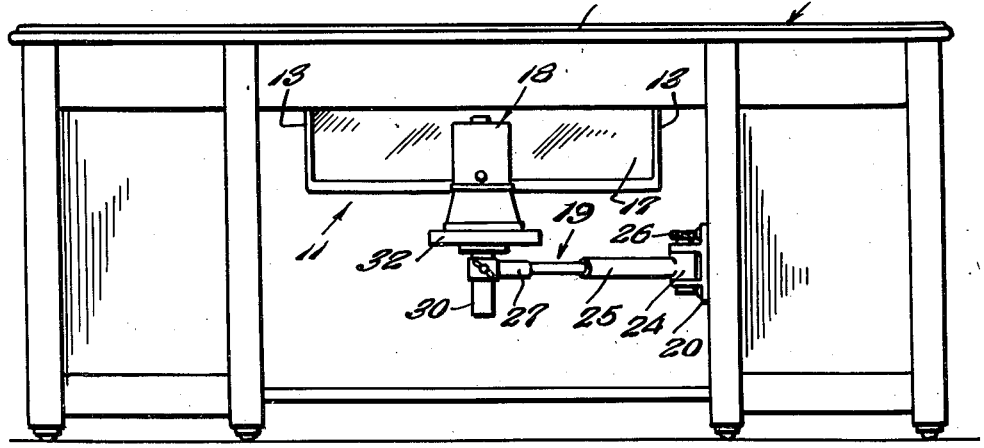
Figure 2 is a front elevational view of the desk illustrating the adjustable projector and associated parts.
Figure 3:
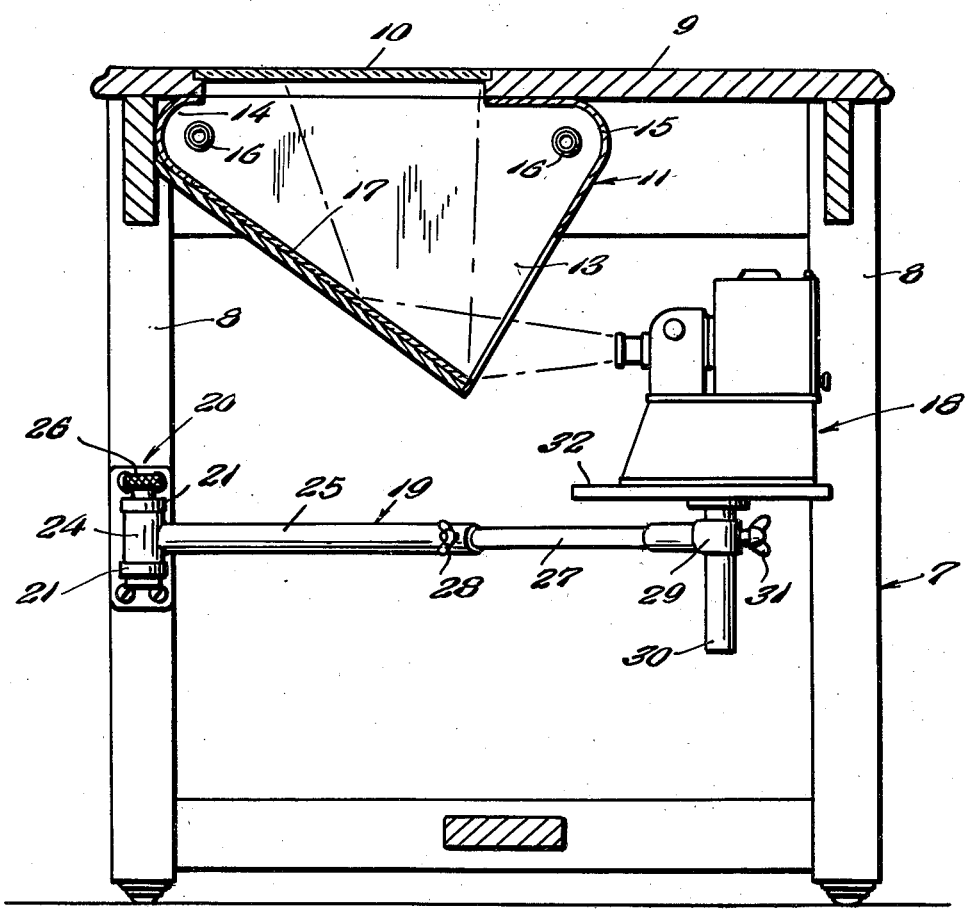
Figure 3 is an enlarged transverse section through the desk with parts in elevation.

Referring now to the drawings by distinguishing reference numerals it will be seen that the desk is generally denoted by the numeral 7. It is of more or less conventional form, being a knee-hole type such as is often used in dental offices. As far as the invention is concerned it will suffice to say that it includes supporting legs 8 and a top 9. The top is provided with an opening at a suitable point representing a sight in which the rectangular screen, of suitable construction, and denoted at 10, is located. The illuminated reflector unit or device is denoted by the numeral 11 and is of visor form, that is, somewhat triangular in general shape, the same including an inclined bottom wall 12 and vertical end walls 13. Horizontal channel-shaped reflectors 14 and 15 are provided, these in opposed parallelism and these house fluorescent bulbs 16 and appropriate supporting fixtures as brought out in Figure 4. An inclined reflecting mirror 17 is supported on the inclined panel or wall 12, this directly beneath the superposed screen 10.

The bracket or fixture, for the projector machine 18 is denoted generally as at 19.

Figure 6:
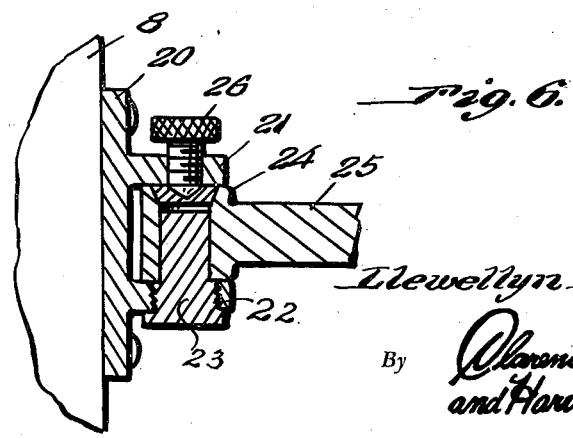
Figure 6 is a fragmentary detailed sectional view showing the mode of anchorage of the projector supporting bracket or fixture.

The fixture construction 19 is partly detailed in Figure 6 wherein it will be observed that a hangar bracket 20 is mounted on one of the legs 8. This is provided with outstanding lugs or ears 21 and 22 and a journal 23 is mounted in the ear 22, this to serve as a pintle for the bearing 24 on the adjacent fixture arm 25. A set-screw 26 is threaded through the ear 21 and serves to press a suitable end-thrust-container into the bearing. It is understood, however, that any suitable means may be provided for hingedly and adjustably mounting the arm 25 in place. The arm serves to accommodate a telescoping rod 27 held in place by a set-screw 28 and said rod terminates in an adapter eye 29 for the post 30. The post is held by a set-screw 31 and is attached to the tray or plate 32 which accommodates the conventional projector 18. This arrangement of brackets and fixtures serves to enable the user to conveniently position the camera or projector in desired focal relation with the reflector 17.

*Purpose and operation of desk in dental office*

After roentgenographic films taken of a patient have been processed and mounted and before the patient returns to the office for a diagnosis the mounted films are placed on top of the desk with the fluorescent or incandescent lights on so reflected light will pass through illuminator opening on top of the desk and through X-rays. The X-rays are studied in their natural size in this manner and because the opening is large enough to accommodate more than one set of films the set being studied can be compared with another or other sets for the purpose of comparison between more normal or more pathological conditions present or found in any or all of the various sets of films studied.

After careful study of the films on the top of the desk where they are viewed in their natural size and by light passing through the films they are transferred to the projector and so employed are projected in the enlargement desired onto the mirror which in turn reflects the enlarged image of a single film unto the daylight screen in top of desk. The enlarged picture accentuates the film as previously viewed on top of the table.

The films are diagnosed by the doctor in this manner or as one sees fit and now the patient returns to office for a reading.

With the patient seated across or on the opposite side of the table the process described above is repeated for the purpose of enlightening the patient as to his dental health.

To begin the reading we place the patient's set of films which are as near normal as we have. We compare each small film or each tooth and its supporting structures in their normal size pointing out in the patient's pictures any deviations from the normal thereby educating him dentally.

After thoroughly reading the films with the patient in this manner we again place the films in the projector and blow up each picture. In this enlarged state the patient sees and understands more readily the conditions pointed out previously.

In the past all illuminating and viewing and enlarging equipment employed in the dental office has been for the convenience of the doctor and not the patient. My desk simplifies the whole procedure in that the patient is seated in a separate room away from the baffling and frightening equipment of a dental operating room in a chair to which he is accustomed and in a place where all his mental reactions are concentrated on the subject at hand; and at a desk where all business transactions should be completed before progressing with treatment.

In the field of photographic work dentistry now includes the taking of Kodochrome before and after pictures of the mouths of patients. When a patient presents himself with a badly broken down or diseased mouth a colored picture is taken of the condition and when the mouth has been restored another colored picture is taken. These colored transparencies are made up into slides which can be inserted into the projector on my desk and projected unto the screen in the desk top for the purpose of educating other patients in the value of mouth care and health and appearance.

In my mind the possibilities of my combination dental diagnosis and office desk is unlimited and from the standpoint of the patient or the layman it is something dentists have needed for many years.

It is thought that persons skilled in the art to which the invention relates will be able to obtain a clear understanding of the invention after considering the description in connection with drawings. Therefore, a more lengthy description is regarded as unnecessary.

Minor changes in the shape, size and arrangement of details coming within the field of invention claimed may be resorted to in actual practice, if desired.

Having described the invention, what is claimed as new is:

1. Dental office furniture for conjoint use by a dentist and patient for diagnoses and slide study, comprising a desk including a top, supporting legs for said top, a viewing screen in said top, a partially enclosed and light shielded and illuminated reflector unit fastened on the underside of said top in optical projection alignment with said viewing screen, and an adjustably mounted projector apparatus carried by said desk and supported in operative relation to said reflector unit and screen by a pivoted, horizontally extending arm secured to the underside of said desk, whereby pictures in the projector may be focused upon said screen, by way of the reflector and films or pictures supported on said screen, may be viewed.

2. In a dental office diagnosis desk for the purpose of X-ray and slide study, projection and viewing of patient and education diagnosis, a leg-supported desk top having a viewing screen embodied therein, a partially enclosed and light shielded reflector unit mounted on the underside of said top in optical alignment with said screen, an extensible and projectable fixture swingably mounted on one of said legs and located primarily beneath said top and reflector, a projector, and a support for said projector adjustably mounted on said extensible and retractable fixture, said support positioning said projector in operative relation beyond the perimeter of the top and in a plane proper in relation to said reflector unit, whereby pictures in the projector may be focused upon said screen, by way of the reflector, and films or pictures supported on said screen may be independently viewed.

3. A dental X-ray film inspection and diagnosis device comprising a leg-supported top, said top having a screen opening therein, a supporting fixture hingedly mounted for horizontal swinging from one of the legs and including an extensible and retractable and vertically adjustable support for a projector apparatus, a reflector unit comprising a shield, said shield including an inclined central panel and a pair of upstanding end walls, electric lamp adapters mounted between the end walls and secured to the underside of said top, a reflector carried by said panel and located directly beneath and in optical projection alignment with the opening in said top, and a viewing screen mounted in said opening above said reflector.

LLEWELLYN M. DAHL.